United States Patent [19] [11] 4,324,874
Cordes, III et al. [45] Apr. 13, 1982

[54] PRODUCTION OF VINYL HALIDE POLYMERS WITH DIALKYL, HYDROXY PHENYL ALKANOIC ESTER OF POLYHYDRIC ALCOHOLS

[75] Inventors: William F. Cordes, III, East Brunswick; Donald Goodman, Flemington; Robert S. Miller, Bridgewater all of N.J.

[73] Assignee: Tenneco Chemicals, Inc., Piscataway, N.J.

[21] Appl. No.: 195,275

[22] Filed: Oct. 8, 1980

[51] Int. Cl.³ ............................ C08F 2/42; C08F 2/20
[52] U.S. Cl. ..................................... 526/84; 526/200; 526/209; 526/212
[58] Field of Search .................... 526/82, 84, 209, 212

[56] References Cited
U.S. PATENT DOCUMENTS 2,662,867 12/1953 Hoertz .............................. 260/29.6
3,285,855 11/1966 Dexter ................................. 252/57
3,502,629 3/1970 Matthews ....................... 526/212 X
3,642,868 2/1972 Dexter .............................. 260/45.85
3,644,482 2/1972 Dexter ................................ 252/404
3,801,540 4/1974 Dexter ............................... 252/48.6

Primary Examiner—C. A. Henderson
Attorney, Agent, or Firm—Evelyn Berlow

[57] ABSTRACT

The polymerization of a monomer component that comprises vinyl chloride in an aqueous medium in the presence of a free radical generating polymerization initiator is terminated by introducing into the polymerization reaction mixture when from 70% to 95% of the monomer component has been polymerized from 0.01% to 0.10% by weight, based on the weight of the monomer component, of a chain-terminating agent that is a dialkylhydroxyphenylalkanoic acid ester of a neopentyl polyhydric alcohol, such as pentaerythritol tetrakis-[3-(3,5-di-tert.butyl-4-hydroxyphenyl)propionate].

2 Claims, No Drawings

PRODUCTION OF VINYL HALIDE POLYMERS WITH DIALKYL, HYDROXY PHENYL ALKANOIC ESTER OF POLYHYDRIC ALCOHOLS

This invention relates to an improved process for the production of vinyl halide polymers. More particularly, it relates to a process for the polymerization of a monomer component that comprises a vinyl halide in an aqueous medium in the presence of a free radical generating polymerization initiator in which the chain-terminating agent is a dialkylhydroxyphenylakanoic acid ester of a neopentyl polyhydric alcohol.

BACKGROUND OF THE INVENTION

In the production of vinyl halide polymers, it is common practice to stop the polymerization reaction by which these polymers are produced at a stage prior to that at which the reaction would ordinarily come to a halt in order to obtain stable uniform products having the desired porosity, melt viscosity, and other properties. Chain termination is usually effected by incorporating in the polymerization mixture a compound that will act as chain-terminating or shortstopping agent for the polymerization reaction without adversely affecting the color of the vinyl halide polymer. The chain-terminating agent also serves to prevent polymerization of recovered monomer and to prevent degradation of the polymer when it is heated during the monomer-removal steps and/or the drying step of the process.

In U.S. Pat. No. 2,662,867, Hoertz disclosed the use of water-soluble phenols, quinones, and nitro-aromatic compounds as chain-terminating agents in the preparation of vinyl chloride polymers. He taught that these compounds function as free radical scavengers that react with the free radicals generated by residual catalyst, from active polymer chains, and from reaction between unreacted monomer and residual. He further indicated that the addition of these chain-terminating agents stabilizes the polymer not by reacting with the liberated hydrohalogen acid but rather by destroying the free radicals in the dispersion before polymer decomposition is inaugurated.

In the commercial production of vinyl chloride polymers, one of the most frequently used chain-terminating agents is 2,6-di-tertiary butyl-p-cresol (BHT). 2,6-Di-tertiary butyl-p-cresol not only acts as an efficient chain-terminating agent during the final processing steps and yields polymers having the desired combination of physical properties but also provides some improvement in the long term heat stability of the finished resin.

SUMMARY OF THE INVENTION

It has now been found that certain esters of neopentyl polyhydric alcohols are more effective than 2,6-di-tertiary butyl-p-cresol as chain-terminating agents in the polymerization of vinyl halide monomers in an aqueous medium in the presence of free radical generating polymerization initiators in that they provide equivalent chain termination and yield polymers having similar color, porosity, and melt viscosity when a much smaller amount of the chain-terminating agent is used. In addition, the polymers prepared using these novel chain-terminating agents have better long term stability than those prepared using four times as much 2,6-di-tertiary butyl-p-cresol as the chain-terminating agent.

DETAILED DESCRIPTION OF THE INVENTION

The chain-terminating agents that are used in the practice of this invention are dialkylhydroxyphenylalkanoic acid esters of neopentyl polyhydric alcohols that have the structural formula

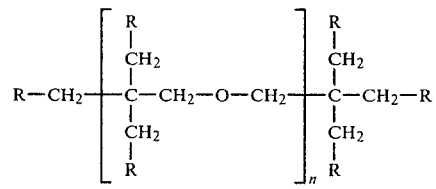

wherein each R represents a group having the structural formula

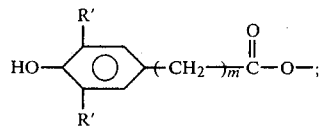

each R' represents an alkyl group having 1 to 6 carbon atoms; m is a number in the range of 1 to 6; and n is a number in the range of 0 to 2. These chain-terminating agents are esters of pentaerythritol, dipentaerythritol, and tripentaerythritol that contains 4, 6, and 8 hindered phenolic groups, respectively. Illustrative of these chain-terminating agents are the following esters:

pentaerythritol tetrakis-(3,5-di-tert.butyl-4-hydroxyphenyl acetate)
pentaerythritol tetrakis-[3-(3,5-dimethyl-4-hydroxyphenyl)propionate]
pentaerythritol tetrakis-[3-(3,5-diisopropyl-4-hydroxyphenyl)propionate]
pentaerythritol tetrakis-[4-(3,5-di-tert.butyl-4-hydroxyphenyl)butyrate]
pentaerythritol tetrakis-[4-(3-methyl-4-hydroxy-5-hexylphenyl)butyrate]
pentaerythritol tetrakis-[6-(3,5-diethyl-4-hydroxyphenyl)hexanoate]
pentaerythritol tetrakis-[7-(3-ethyl-4-hydroxy-5-amylphenyl)heptanoate]
pentaerythritol tetrakis-[3-(3-isopropyl-4-hydroxy-5-n-butylphenyl)propionate]
pentaerythritol tetrakis-[3-(3,5-di-tert.amyl-4-hydroxyphenyl)propionate]
dipentaerythritol hexakis-[3-(3,5-dimethyl-4-hydroxyphenyl)propionate]
dipentaerythritol hexakis-(3,5-diethyl-4-hydroxyphenylacetate)
dipentaerythritol hexakis-[7-(3,5-di-tert.butyl-4-hydroxyphenyl)heptanoate]
dipentaerythritol hexakis-[3-(3,5-di-tert.butyl-4-hydroxyphenyl)propionate]
dipentaerythritol hexakis-[3-(3-methyl-4-hydroxy-5-tert.butylphenyl)propionate]
tripentaerythritol octakis-[3-(3,5-dimethyl-4-hydroxyphenyl)propionate]
tripentaerythritol octakis-[4-(3,5-di-tert.butyl-4-hydroxyphenyl)butyrate]
tripentaerythritol octakis-[7-(3-methyl-4-hydroxy-5-tert.butylphenyl)heptanoate]

tripentaerythritol octakis-[3-(3,5-di-tert.butyl-4-hydroxyphenyl)propionate] and mixtures thereof.

A preferred group of chain-terminating agents are pentaerythritol esters of 3-(3,5-dialkyl-4-hydroxyphenyl)propionic acids that have the structural formula

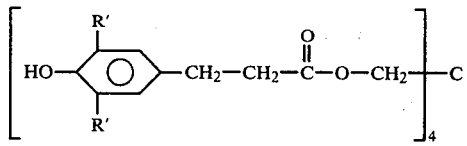

Examples of these esters are
pentaerythritol tetrakis-[3-(3,5-dimethyl-4-hydroxyphenyl)propionate]
pentaerythritol tetrakis-[3-(3-methyl-4-hydroxy-5-hexylphenyl)propionate]
pentaerythritol tetrakis-[3-(3,5-di-tert.butyl-4-hydroxyphenyl)propionate], and
pentaerythritol tetrakis-[3-(3,5-dihexyl-4-hydroxyphenyl)propionate].

The most effective chain-terminating agent is pentaerythritol tetrakis-[3-(3,5-di-tert.butyl-4-hydroxyphenyl)propionate], which is alternatively named tetrakis-[methylene 3-(3,5-di-tert.butyl-4-hydroxyphenyl)propionate]methane and tetrakis-[methylene (3,5-di-tert.butyl-4-hydroxyhydrocinnamate)]methane. This ester is marketed as IRGANOX 1010 by Ciba-Geigy Corp.

The preparation of the dialkylhydroxyphenylalkanoic acid esters of neopentyl polyhydric alcohols and their use as polymer antioxidants are disclosed in U.S. Pat. Nos. 3,285,855, 3,642,868, 3,644,482, and 3,801,540, which are incorporated herein by reference.

The amount of the hindered hydroxyphenylalkanoic acid ester that is used in the practice of this invention is that which will terminate the polymerization reaction quickly and will stabilize the polymer from degradation that may occur during the monomer-removal step and/or the drying step without affecting the course of the polymerization reaction or the other properties of the products. In most cases, from 0.01% to 0.10% by weight, based on the weight of the monomer component of the polymerization reaction mixture, is used. Best results have been obtained when from 0.2% to 0.5% by weight of the chain-terminating agent, based on the weight of the monomer component, was used.

In the practice of the process of this invention, the chain-terminating agent is added to the aqueous polymerization reaction mixture when from about 70% to 95%, preferably 75% to 90%, of the monomer component has been converted to polymer. Thereafter, the unreacted vinyl chloride monomer is removed from the aqueous medium and the polymer is recovered and dried in the usual manner.

The process of this invention may be used in the production of vinyl halide homopolymers as well as polymers formed by the copolymerization of a vinyl halide with a water-insoluble ethylenically-unsaturated monomer that is copolymerizable therewith. The vinyl halide is ordinarily and preferably vinyl chloride, but the bromide, fluoride, and iodide can also be used. Suitable comonomers include vinyl acetate, vinyl propionate, vinyl stearate, vinyl benzoate, ethylene, propylene, methyl methacrylate, ethyl acrylate, allyl acrylate, acrylamide, acrylonitrile, methacrylonitrile, vinylidene chloride, vinyl ethers, dialkyl fumarates and maleates, and the like. When one or more of the aforementioned comonomers are used, the monomer component contains at least 70 percent by weight of the vinyl halide. It is preferred that the monomer component consist essentially of vinyl chloride or that it contain about 80 percent to 90 percent by weight of vinyl chloride and 10 percent to 20 percent by weight of vinyl acetate.

The polymerization reactions of this invention are carried out in the conventional manner using the well-known emulsion or suspension polymerization techniques. In the suspension polymerization process, a vinyl halide or a mixture of a vinyl halide with at least one comonomer is suspended in water by the use of suspending agents and agitation. The polymerization is started by means of a free radical generating polymerization initiator, such as lauroyl peroxide, benzoyl peroxide, diisopropyl peroxydicarbonate, tertiary butyl peroxypivalate, azobisisobutyronitrile, azobis-2,4-dimethylvaleronitrile, combinations of dialkyl peroxydicarbonates and lauroyl peroxide, sulfonyl peroxides, and the like. Suspending agents, such as methylcellulose, hydroxymethylcellulose, hydroxyethylcellulose, hydroxypropylmethylcellulose, hydrolyzed polyvinyl acetate, gelatin, methyl vinyl ether-maleic anhydride copolymers, and mixtures thereof, are included in the polymerization reaction mixture. In the emulsion polymerization process, vinyl halide homopolymers and copolymers are prepared using such initiators as hydrogen peroxide, organic peroxides, persulfates, and redox systems and such surface-active agents as alkyl sulfate, alkane sulfonates, alkylaryl sulfonates, and fatty acid soaps. The polymerization is usually carried out at a temperature in the range of 40° C. to 80° C. The polymers that are produced may be separated and dried by spray-, drum-, or tray-drying techniques.

The invention is further illustrated by the following examples

EXAMPLE 1

A series of polyvinyl chloride polymers was prepared by the bottle polymerization procedure. In this procedure, a polymerization system that consisted of 125 grams of deionized water, 25 grams of a cellulose ether derivative (Methocel, as 2% aqueous solution), 0.04 gram of lauroyl peroxide, 0.06 gram of di-2-ethylhexyl peroxydicarbonate, and 80 grams of vinyl chloride was charged to a bottle. The bottle was capped, placed in a bath at 56.7° C., and agitated for 16 hours. The bottle was then opened and vented, and a terminating agent was added to it. The recapped bottle was returned to the bath and agitated at 56.7° C. for 3 hours. The polymerization mixture was filtered, and the recovered polymer was dried at 40° C. for about 8 hours.

In this series of polymerizations, four bottles of polymer dispersion were treated with each of the following amounts of chain-terminating agent:

| Example No. | Chain-Terminating Agent | Amount of Chain-Terminating Agent Charged | |
|---|---|---|---|
| | | grams | parts/100 parts of vinyl chloride |
| 1A | Pentaerythritol tetrakis-[3-(3,5-di-tert.butyl-4-hydroxyphenyl)propionate] | 0.036 | 0.0445 |
| 1B | Pentaerythritol tetrakis-[3-(3,5-di-tert.butyl-4-hydroxyphenyl)propionate] | 0.018 | 0.0223 |

-continued

| Example No. | Chain-Terminating Agent | Amount of Chain-Terminating Agent Charged | |
|---|---|---|---|
| | | grams | parts/100 parts of vinyl chloride |
| 1C (Control) | 2,6-Di-tert.butyl-p-cresol | 0.071 | 0.089 |
| 1D (Control) | None | — | — |

The four portions of polymer prepared using each of the amounts of chain-terminating agents indicated above were combined to obtain about 300 grams of dried polyvinyl chloride.

The color, porosity, and melt viscosity of the products of Examples 1A and 1B were equivalent to those of the product of the control, Example 1C.

EXAMPLE 2

Polyvinyl chloride resin compositions were prepared by mixing 44.4 parts by weight of polyvinyl chloride prepared by the procedure of Example 1 with 11.1 parts by weight of di-2-ethylhexyl phthalate, 0.2 part by weight of stearic acid, and 1.1 parts by weight of a Ba/Cd stabilizer (Nuostabe V-1397).

The heat stability of the compositions was determined by working 56.8 grams of each of the compositions in a Brabender Plasticorder No. 3 using a No. 6 roller head, a bowl temperature of 174° C., and a rotor speed of 50 rpm. After the material had fused, samples were removed at 2 minute intervals until degradation had taken place as indicated by dark amber or black coloration of the sample. The following results were obtained:

| Example No. | Polyvinyl Chloride Used in the Formulation | Degradation Time (Minutes) at 174° C. |
|---|---|---|
| 2A | Product of Ex. 1A | 26 |
| 2B | Product of Ex. 1B | 26 |
| 2C (Control) | Product of Ex. 1C | 22 |
| 2D (Control) | Product of Ex. 1D | 20 |

From the data in the foregoing table, it will be seen that the compositions that contained polyvinyl chloride prepared by the process of this invention had far better long term heat stability than did those that contained polyvinyl chloride prepared by previously-known processes even when only one-fourth as much chain-terminating agent was used.

Each of the othr neopentyl polyhydric alcohol esters disclosed herein can be used in a similar way as the chain-terminating agent in the polymerization of a monomer component that comprises a vinyl halide to form polymers that have improved long term heat stability.

What is claimed is:

1. In the process for the polymerization of a monomer component selected from the group consisting of vinyl halides and mixtures of a vinyl halide with at least one ethylenically-unsaturated monomer that is copolymerizable therewith, said mixtures containing at least 70% by weight of the vinyl halide, in an aqueous medium at a temperature in the range of 40° C. to 80° C. in the presence of a free radical generating polymerization initiator, the improvement that comprises adding to the polymerization reaction mixture when from about 75% to 90% of the monomer component has been polymerized from 0.02% to 0.05% by weight, based on the weight of the monomer component, of a chain-terminating agent having the structural formula

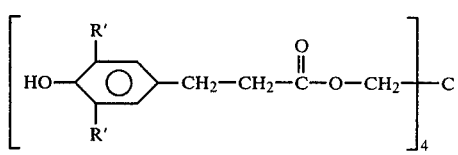

wherein each R' represents an alkyl group having 1 to 6 carbon atoms.

2. The process of claim 1 wherein the chain-terminating agent is pentaerythritol tetrakis-[3-(3,5-di-tert.butyl-4-hydroxyphenyl)propionate].

* * * * *